United States Patent [19]
Falatok et al.

[11] Patent Number: 6,003,570
[45] Date of Patent: Dec. 21, 1999

[54] STUMP GRINDER MACHINE HAVING TURNTABLE MOUNTED ENGINE ARRANGEMENT

[76] Inventors: Daniel R. Falatok, 331 E. Killinary Lake Dr., Moore, S.C. 29369; John T. Bird, 10 Terra Lea, Greenville, S.C. 29615; Kenneth W. Kilpatrick, 880 Old Dacusville Rd., Easley, S.C. 29640

[21] Appl. No.: 09/181,012

[22] Filed: Oct. 27, 1998

[51] Int. Cl.⁶ ................................................. A01G 23/06
[52] U.S. Cl. ........................... 144/24.12; 37/302; 83/928; 144/334; 144/4.1; 241/101.72
[58] Field of Search .................. 37/301, 302; 144/24.12, 144/334, 34.1, 335, 336; 83/928; 241/101.72

[56] References Cited

U.S. PATENT DOCUMENTS

| | | |
|---|---|---|
| Re. 28,651 | 12/1975 | Welborn . |
| 1,397,324 | 11/1921 | Moore . |
| 3,308,860 | 3/1967 | De Shano ............................ 144/24.12 |
| 3,664,645 | 5/1972 | Cobey ................................ 241/101.72 |
| 3,818,957 | 6/1974 | Schoonover . |
| 4,565,486 | 1/1986 | Crawford et al. ...................... 144/4.1 |
| 4,583,908 | 4/1986 | Crawford et al. ...................... 144/4.1 |
| 4,823,852 | 4/1989 | Langford ................................ 144/4.1 |
| 5,203,388 | 4/1993 | Bowling . |
| 5,431,349 | 7/1995 | Purser ............................... 241/101.72 |
| 5,588,474 | 12/1996 | Egging .............................. 241/101.72 |
| 5,660,217 | 8/1997 | Nissley ................................ 144/24.12 |
| 5,823,238 | 10/1998 | Bohnke .................................. 144/334 |

OTHER PUBLICATIONS

Brochure entitled "Levco HD 50 Stump Grinder Your "One-Man" Stump Removal System," published by Levco Manufacturers, Inc. of Wynne, Arkansas.

Brochure regarding Models 206, 630B, 665A and 2465 stump cutters, publsihed by Vermeer Manufacturing Company of Pella, Iowa.

Brochure entitled "Stump Cutters," published by J.P. Carlton Company Div. D.A.F., Inc of Spartanburg, South Carolina.

Brochure regarding Rayco RGV 1672 DXH Super Cutter, published by Rayco Mfg. Co. of Wooster, Ohio.

Brochure regarding Rayco RG 1672 Diesel Stump Cutter, published by Rayco Mfg. Co. of Wooster, Ohio.

Catalog entitled "Kaydon: Turning Ideas Into Engineered Solutions," published by Kaydon Corporation, apparently dated Sep. 1991.

*Primary Examiner*—W. Donald Bray
*Attorney, Agent, or Firm*—Dority & Manning, P.A.

[57] ABSTRACT

An improved stump grinding machine includes a turntable assembly on which the engine is mounted for rotation in a horizontal plane. Preferably, the turntable assembly includes a flat plate element on which the engine is carried. One rotatable ring of a turntable bearing is connected to the plate element for rotation therewith. The other ring of the turntable bearing is fixedly connected to the machine frame. A grinding wheel is located at the distal end of an arm structure pivotally connected to the plate element. The grinding wheel is driven from the engine by a pair of successive belt stages. Power between the belt stages is transferred at an idler shaft about which the arm structure pivots. The stump grinding machine includes a hydraulic system to effect horizontal and vertical movement of the grinding wheel as necessary during a cutting operation. The stump grinding machine may be a self-propelled machine, or may be configured for towing behind a vehicle.

13 Claims, 6 Drawing Sheets

STUMP GRINDER MACHINE HAVING TURNTABLE MOUNTED ENGINE ARRANGEMENT

BACKGROUND OF THE INVENTION

The present invention relates generally to stump grinding machines of the type having a grinding wheel located at the end of a movable arm structure. More particularly, the invention relates to a stump grinding machine incorporating a novel turntable arrangement for mounting of the engine.

Stump grinding machines are widely used to remove tree stumps. The stump is removed by a driven grinding wheel located at the end of the machine's movable cutting arm. Typically, the grinding wheel is swept back and forth across the tree stump. With each sweep, the grinding wheel is lowered slightly until the entire stump has been removed. The final sweeps of the grinding wheel may be below ground level to ensure that the entire stump has been eliminated.

Often, stump grinding machines are constructed on a wheeled frame to facilitate movement of the machine from place to place. The frame may be self-propelled, or configured to be towed behind another vehicle. Power to drive the grinding wheel is derived from an engine, typically a gasoline or diesel engine, located on the wheeled frame. A series of belts are generally provided to transfer engine power to the grinding wheel. Often, the engine has been mounted on the arm structure, which is in turn connected to the frame for pivotal movement in both horizontal and vertical planes.

While these arrangements have worked generally well, they are not without disadvantages. For example, the engine adds weight to the arm structure. In addition, placement of the engine in this location tends to raise the center of gravity of the overall machine. It has often been necessary to compensate for the higher center of gravity by providing a wider frame structure. A wider frame structure, however, is often not desirable since it can limit the ability of the stump grinding machine to pass through narrow gates and the like. This arrangement can also limit the angular extent of the sweep and the vertical arc through which the grinding wheel can move.

SUMMARY OF THE INVENTION

The present invention recognizes and addresses the foregoing disadvantages, and others, of prior art constructions and methods. Accordingly, it is an object of the present invention to provide a novel stump grinding machine.

It is a further object of the present invention to provide a novel stump grinding machine in which the engine is mounted away from the pivotal cutting arm.

It is a further object of the present invention to provide a stump grinding machine having a novel turntable arrangement for mounting of the engine.

It is an additional object of the present invention to provide a stump grinding machine in which vertical movement of the boom does not cause concomitant movement of the engine.

It is a still further object of the present invention to provide a novel turntable assembly for mounting of the engine and pivotal mounting of the cutting arm structure.

Some of these objects are achieved by a stump cutting apparatus comprising a frame structure supported by at least one wheel to facilitate movement of the stump cutting apparatus from place to place. A turntable assembly, carrying an engine thereon, is mounted on the frame structure for rotational movement in a first plane. An arm structure is also provided, having a proximal end and a distal end. The proximal end of the arm structure is pivotably connected to the turntable assembly for movement in a second plane. A grinding wheel is rotatably mounted at the distal end of the arm structure. The grinding wheel is driven by power derived from the engine.

In some exemplary embodiments, the turntable assembly comprises a plate element supporting the engine. The plate element is thus rotatable with respect to the frame structure. In addition, the turntable assembly may include a turntable bearing having first and second rings rotatable with respect to each other. For example, the first and second rings of the turntable bearing may respectively comprise inner and outer radial rings having bearing elements between opposed raceways thereof.

Preferably, the grinding wheel may be driven from the engine by at least one drive belt stage. For example, first and second drive belt stages may be provided such that power to the second drive belt stage is transferred from the first drive belt stage via an idler shaft. In such embodiments, the arm structure may be pivotably connected to the turntable assembly at the idler shaft.

Other objects of the invention are achieved by a stump cutting apparatus having a frame structure and an engine. A turntable assembly is also provided, having a rotatable plate element on which the engine is carried for rotational movement in a substantially horizontal plane. The turntable assembly further includes a turntable bearing having first and second rings rotatable with respect to each other. The first ring is fixed with respect to the frame structure, and the second ring is fixed with respect to the plate element. In addition, an arm structure is pivotably connected to the turntable assembly for movement in a substantially vertical plane. A grinding wheel is rotatably mounted on the arm structure.

In some exemplary embodiments, at least one fluid-actuated cylinder is utilized to effect rotational movement of the plate element. Alternatively, rotational movement of the plate element may be effected by a pinion gear engaging teeth defined on a ring of the turntable bearing.

The arm structure may be pivotally connected to the turntable assembly at a rotatable idler shaft. In this case, power from the engine to the grinding wheel may be transmitted through the idler shaft. For example, power from the engine to the grinding wheel may be transmitted through the idler shaft by belts engaging pulley wheels located at respective ends thereof.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
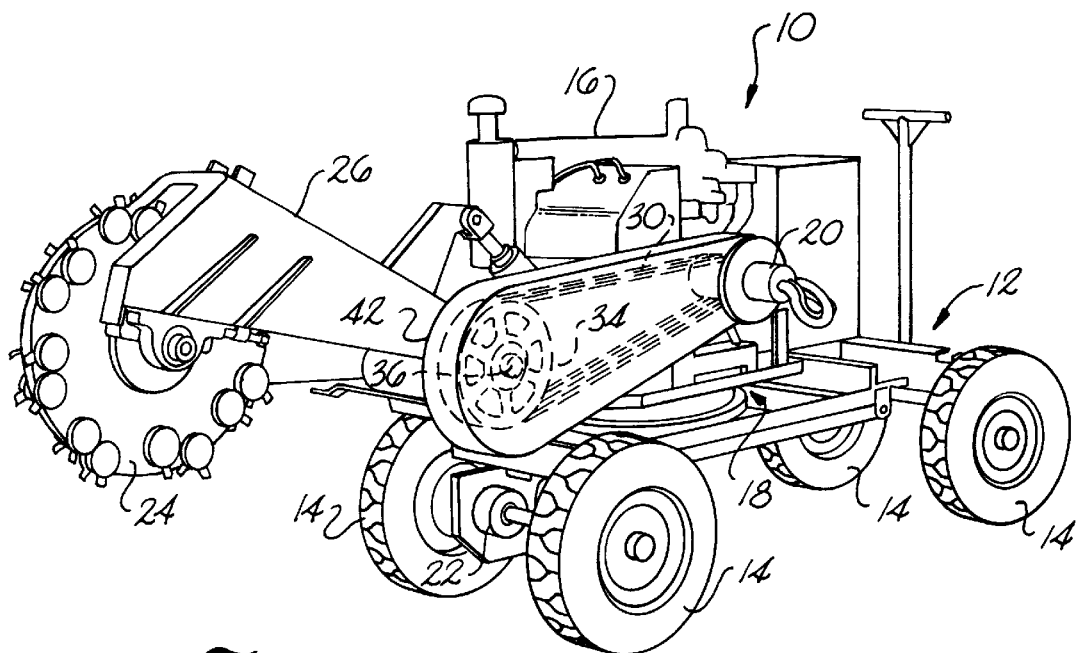
FIG. 1 is a perspective view of a stump grinder machine constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting the broader aspects of the present invention, which broader aspects are embodied in the exemplary constructions.

Figure 2:
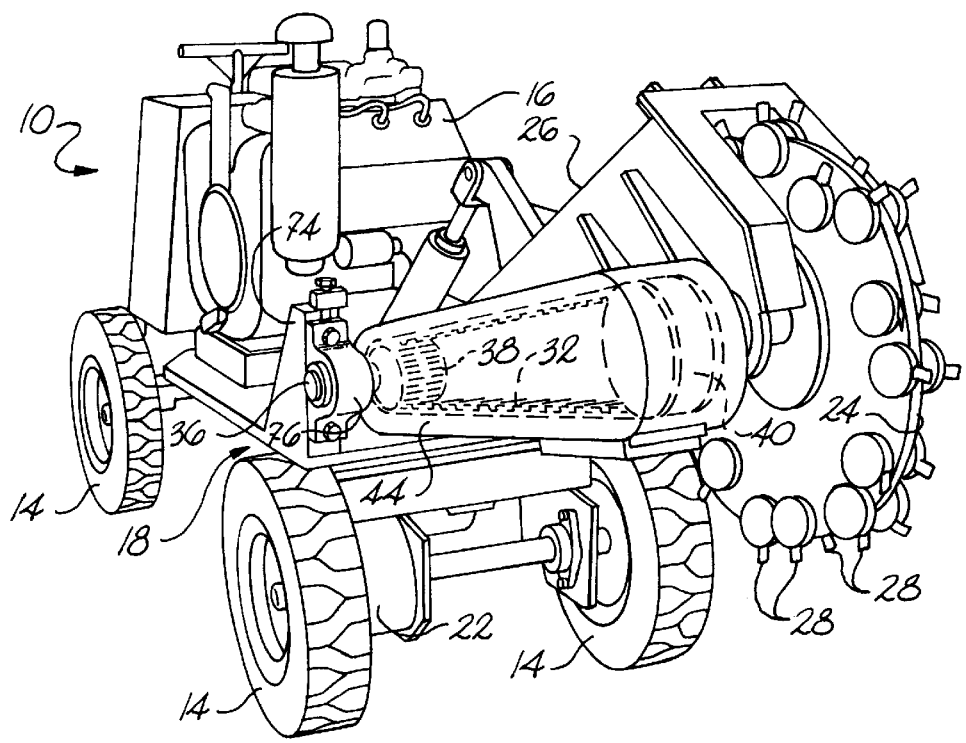
FIG. 2 is an opposite side perspective view of the stump grinder machine shown in FIG. 1.

FIGS. 1 and 2 illustrate an improved stump grinder machine 10 constructed in accordance with the present invention. As shown, machine 10 includes a frame 12 supported by a plurality of wheels 14 to facilitate movement of machine 10 from place to place. As will be described more fully below, an engine 16 is mounted on a turntable assembly 18 for rotational movement through a predetermined horizontal arc.

Typically, machine 10 will include a hydraulic system to power various fluid-actuated cylinders and the like. Energy is supplied to the hydraulic system through a hydraulic pump 20 connected to the output of engine 16. In addition, cylinders may be utilized in a known manner to expand the size of frame 12 for greater stability during the cutting operation.

In the illustrated embodiment, machine 10 is configured as a self-propelled device. As such, hydraulic power, through a hydraulic motor 22, is also used to propel machine 10. It should be distinctly understood, however, that towed stump grinding machines may also be constructed in accordance with the present invention.

The grinding operation is performed by a grinding wheel 24 located at the distal end of an arm structure 26. As shown, grinding wheel 24 has a plurality of radial teeth, such as teeth 28, that grind the stump as grinding wheel 24 is moved across it. Grinding wheel 24 is rotatably driven by successive belt stages 30 and 32 taken off from the output shaft of engine 16. In the illustrated embodiment, belt stage 30 comprises a multiple V-belt stage extending from the output shaft of engine 16 to a pulley 34. As shown, pulley 34 is mounted at one end of an idler shaft 36.

Belt stage 32, which may comprise a poly chain as shown, is then driven from another pulley 38 (here configured as a sprocket) located on the opposite side of arm structure 26. Grinding wheel 24, in turn, is located on a common shaft with pulley 40 and rotates therewith. As shown, belt stages 30 and 32 may be located inside of respective belt guards 42 and 44.

Arm structure 26 is preferably carried by idler shaft 36 in a manner that permits the idler shaft to freely rotate. In other words, a suitable bearing arrangement is provided at the proximal end of arm structure 26 through which idler shaft 36 extends. As a result, arm structure 26 can be pivoted about idler shaft 36 without interfering with operation of grinding wheel 24.

Figure 3:
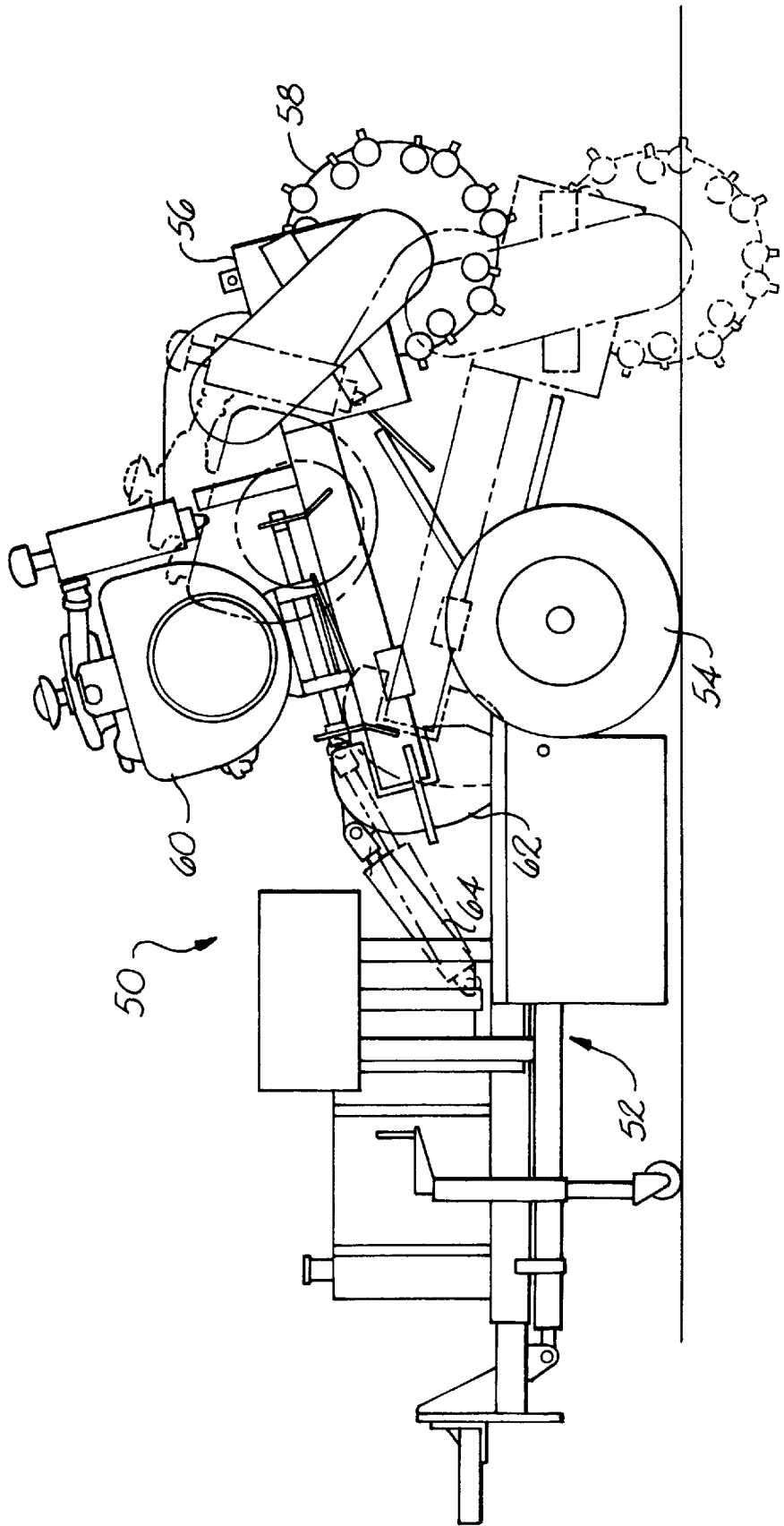
FIG. 3 is a side elevation of a prior art stump grinder machine illustrating vertical movement of the cutting arm structure with phantom lines.

Before discussing various aspects of the present invention in greater detail, it is helpful to review certain prior art. In this regard, FIG. 3 illustrates a typical stump grinding machine 50 constructed in accordance with the prior art. Machine 50 includes a frame structure 52 supported by wheels 54. In this exemplary case, frame structure 52 is configured to be towed behind a vehicle, and backed into the position at which the grinding operation will take place. Machine 50 includes an arm structure 56 rotatably supporting a grinding wheel 58 located at its distal end. Grinding wheel 58, along with the hydraulic system of machine 50, is powered from an engine 60 mounted atop arm structure 56.

The proximal end of arm structure 56 defines a "pivot point" 62 where it is connected to frame structure 52. Pivot point 62 is adapted to permit partial rotational movement of arm structure 56 in both horizontal and vertical planes. This permits grinding wheel 58 to move both laterally and vertically as necessary to cause removal of the stump. Movement of arm structure 56 is effected by a series of hydraulic cylinders, such as hydraulic cylinder 64.

As noted above, an arrangement as illustrated in FIG. 3 gives rise to certain disadvantages. For example, arm structure 56 must support the entire weight of engine 60 as it is moved during the grinding operation. In addition, the vertical arc through which arm structure 56 may move has often been limited in such arrangements. For example, it is often necessary to avoid excessive tilt on engine 60 to prevent it from choking down during operation. The placement of engine 60 atop arm structure 56 also has a tendency to raise the center of gravity of the overall machine. As such, it has often been necessary to provide frame structure 52 with a relatively wide wheel base. A wider frame can inhibit access to some stumps where it is required to pass through a relatively narrow gate or the like.

Figure 4:
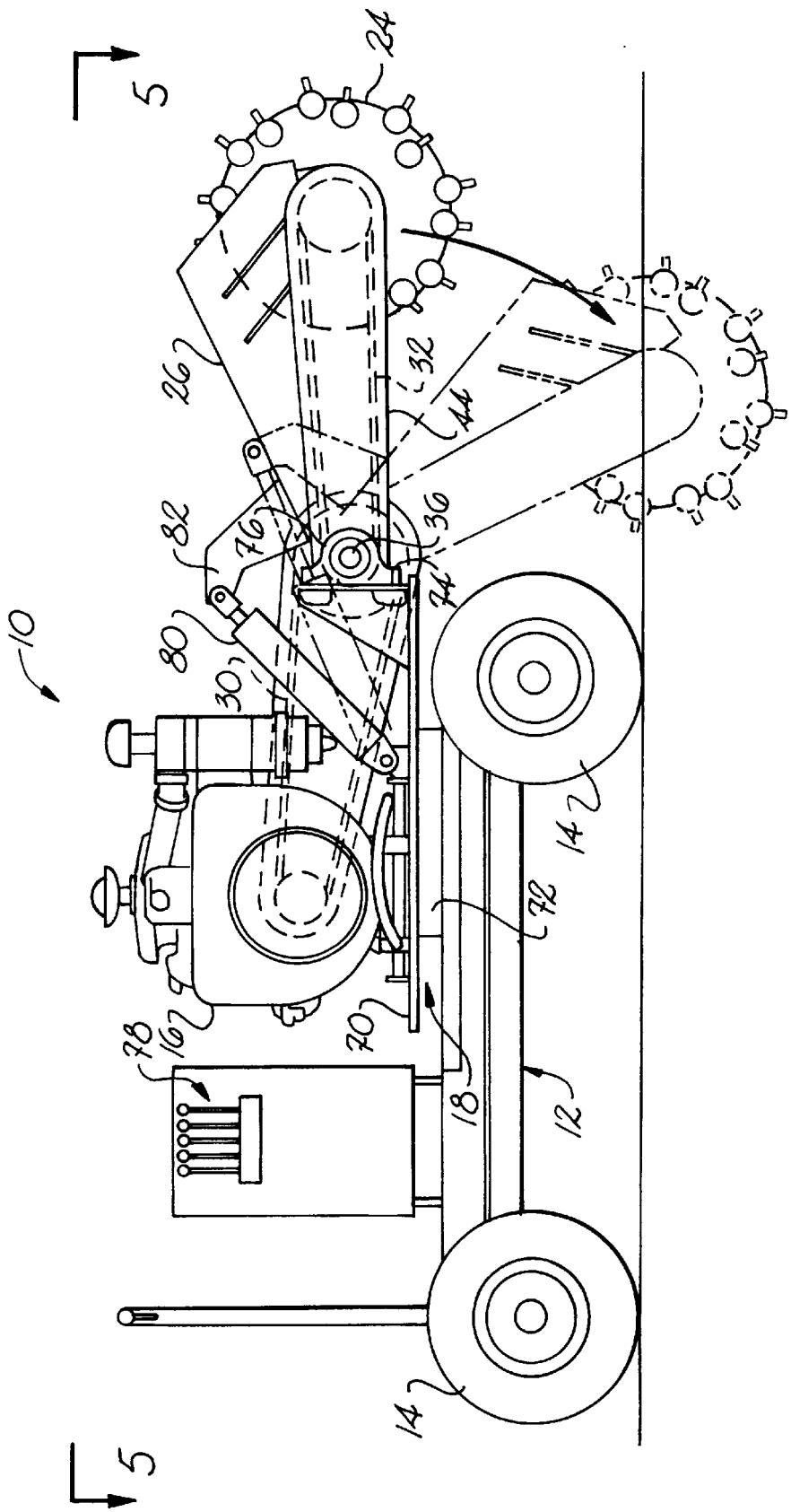
FIG. 4 is a side elevation of the stump grinder machine of FIG. 1 showing vertical movement of the cutting arm structure.
Figure 5:
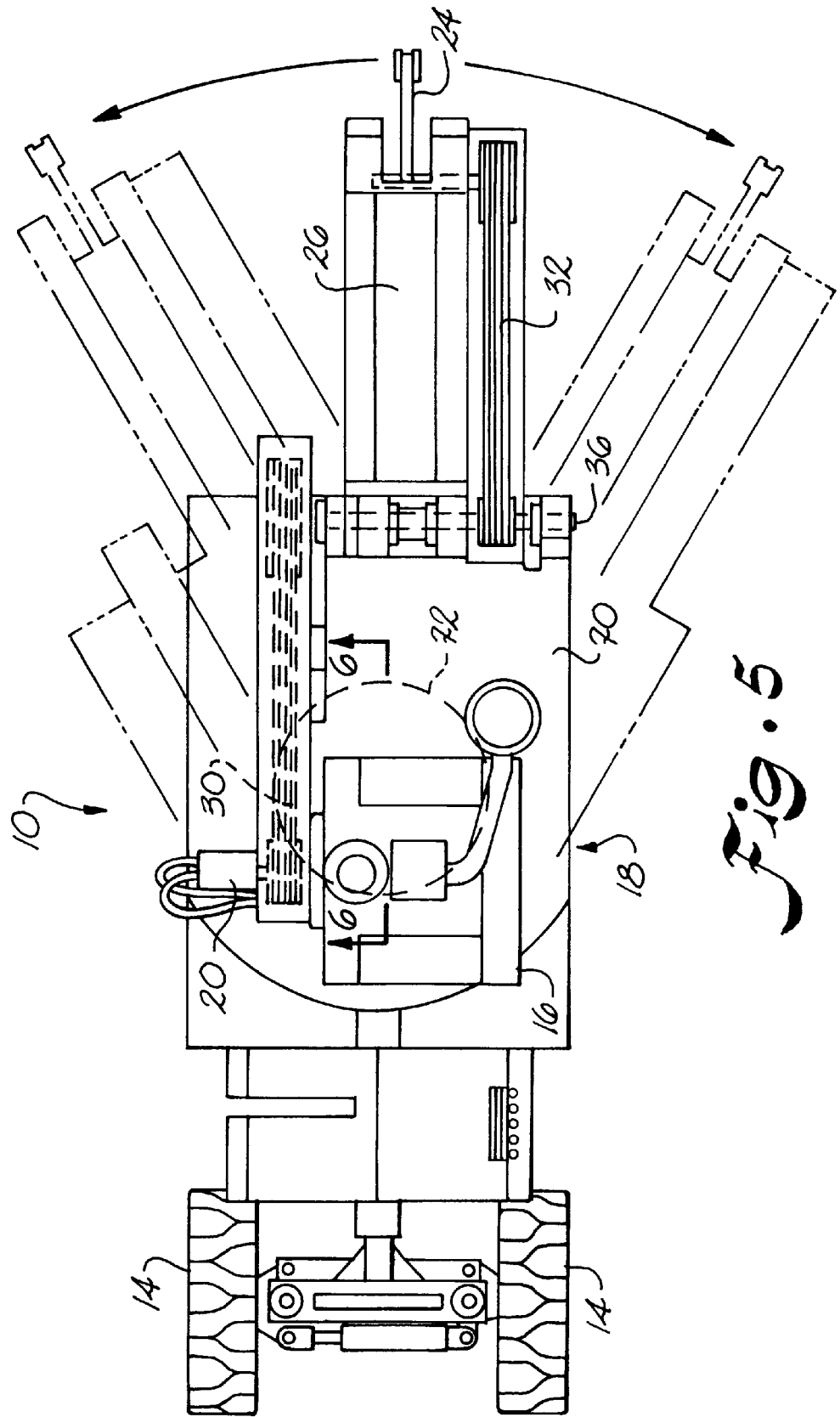
FIG. 5 is a plan view as taken along line 5—5 of FIG. 4 illustrating the horizontal sweep of the turntable assembly and the arm structure carried thereby.

Now that certain prior art has been discussed in greater detail, reference is made to FIGS. 4 and 5 for a further discussion of machine 10. Turntable assembly 18 preferably comprises a plate element 70 on which engine 16 is mounted. Plate element 70 is in turn supported for rotation by a turntable bearing 72 attached to frame structure 12. As shown, plate element 70 includes an upstanding structure 74 at which idler shaft 36 is rotatably mounted, in this case using pillow block bearings such as that indicated at 76.

It can be seen that the horizontal movement of grinding wheel 24 is the result of rotation of plate element 70. Grinding wheel 24 moves in the vertical plane by the pivoting action of arm structure 26. The novel construction of the present invention moves engine 16 away from arm structure 26, thus avoiding the disadvantages noted above. For example, arm structure 26 is not required to support the weight of engine 16. The lower center of gravity resulting from the illustrated construction permits the wheel base of frame structure 12 to be somewhat narrowed. This facilitates access to stumps in some areas where access may not otherwise have been possible. The illustrated construction also allows a significant range of movement in both horizontal and vertical planes.

As noted above, the hydraulic system of machine 10 is utilized to sweep grinding wheel 24 during the grinding operation. As is typical, the hydraulic system may have multiple control levers, as indicated at 78 in FIG. 4. In this regard, arm structure 26 is pivoted by a hydraulic cylinder 80 having one end connected to an upstanding connection member 82. The opposite end of cylinder 80 is pivotally connected to plate element 70 as shown.

Figure 6:
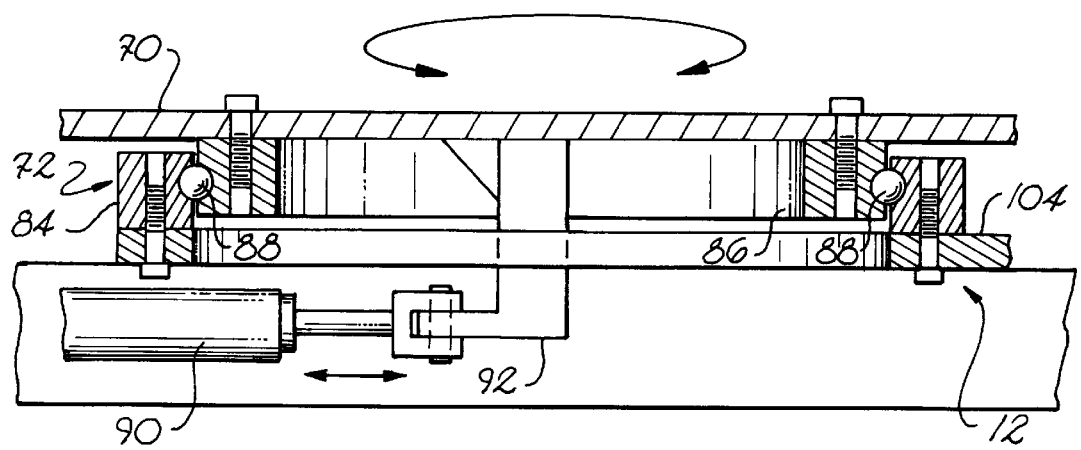
FIGS. 6 and 7 are enlarged, partially cross-sectional views illustrating alternative means for effecting rotation of the turntable assembly.

Further details of turntable bearing 72 can be seen in FIG. 6. As shown, bearing 72 includes an outer ring 84 affixed to frame structure 12. An inner ring 86 is likewise affixed to plate element 70. Rings 84 and 86 define opposed raceways, in which a plurality of bearing elements, such as ball bearings 88, have been disposed. As a result, inner ring 86 will be freely rotatable with respect to outer ring 84, as desired. Rotational movement may be effected by one or more hydraulic cylinders 90, connected on one end to frame structure 12. In this case, the extensible rod of cylinder 90 is pivotally connected to a depending connection member 92 affixed to plate element 70.

Figure 7:
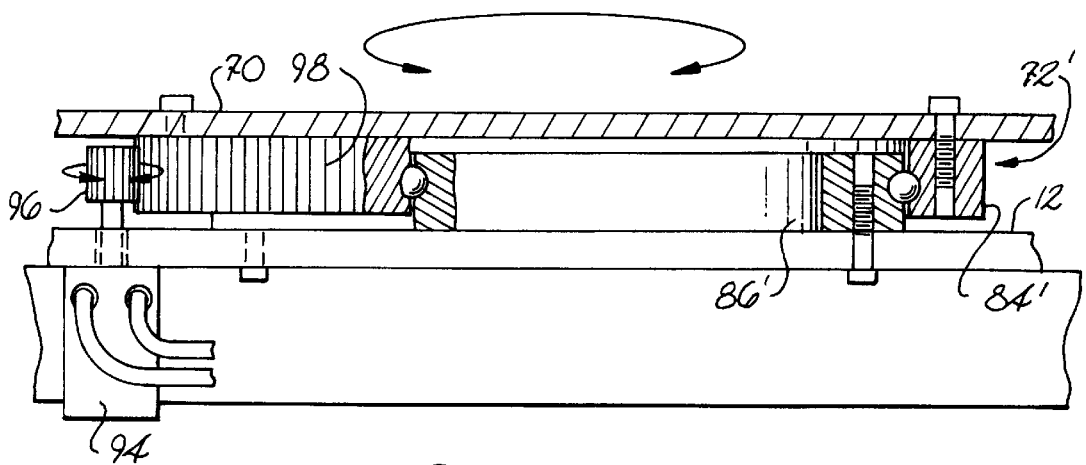

FIG. 7 illustrates an alternative embodiment wherein rotational movement of plate element 70 is effected by a hydraulic motor 94. In this case, bearing 72' includes an outer ring 84' fixedly attached to plate element 70. The inner ring 86' of bearing 72' is affixed to frame structure 12. As can be seen, a pinion gear 96 driven by pump 94 engages gear teeth 98 defined on the outer surface of ring 84'. One advantage of this arrangement is that it may allow a greater degree of rotational movement than can be achieved with the arrangement illustrated in FIG. 6.

Figure 8:
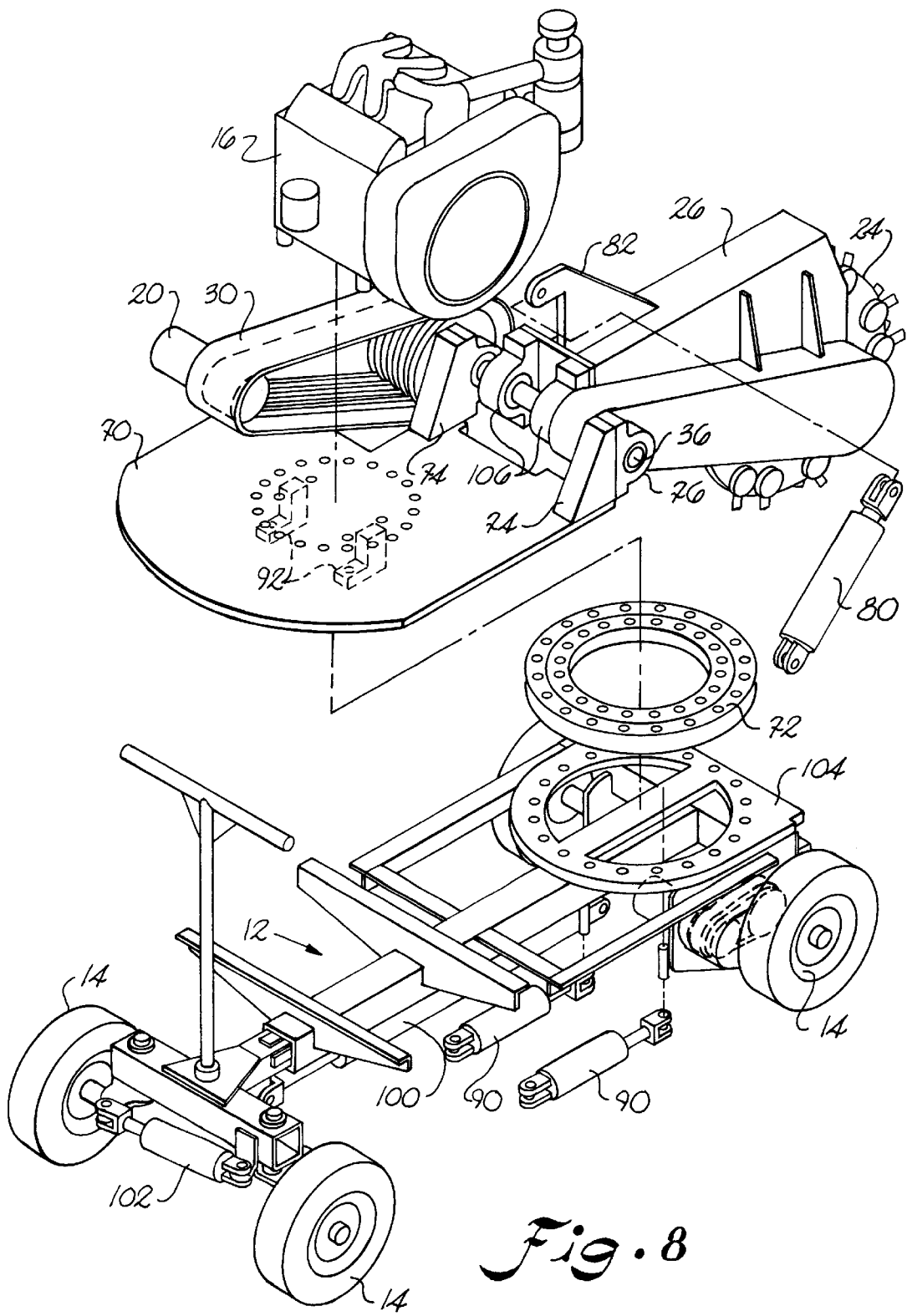
FIG. 8 is an exploded view showing components of the stump grinder machine of FIG. 1.

Certain additional aspects of machine 10 can be most easily understood with reference to FIG. 8. For example, a hydraulic cylinder 100 may be provided to lengthen frame structure 12 before a cutting operation is commenced. As shown, portions of frame structure 12 may be telescopically configured to permit such expansion. Steering of this self-propelled machine is also preferably accomplished hydraulically, such as by steering cylinder 102. Frame structure 12 may comprise a generally flat bearing support 104 on which turntable bearing 72 is maintained. As shown, arm structure 26 may be pivotably supported on idler shaft 36 using pillow block bearings 106.

It can thus be seen that the present invention provides a novel stump grinding apparatus in furtherance of the noted objects. While preferred embodiments of the invention have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A stump cutting apparatus, said apparatus comprising:
   a frame structure supported by at least one wheel to facilitate movement of said stump cutting apparatus from place to place;
   a turntable assembly mounted on said frame for rotational movement in a first plane;
   an engine carried by said turntable assembly;
   an arm structure having a proximal end and a distal end, said proximal end of said arm structure being pivotally connected to said turntable assembly for movement in a second plane; and
   a grinding wheel rotatably mounted at said distal end of said arm structure, said grinding wheel being driven by power derived from said engine.

2. A stump cutting apparatus as set forth in claim 1, wherein said turntable assembly comprises a plate element supporting said engine, said plate element being rotatable with respect to said frame structure.

3. A stump cutting apparatus as set forth in claim 2, wherein said turntable assembly includes a turntable bearing having first and second rings rotatable with respect to each other.

4. A stump cutting apparatus as set forth in claim 3, wherein said first and second rings of said turntable bearing respectively comprise inner and outer radial rings having bearing elements between opposed raceways thereof.

5. A stump cutting apparatus as set forth in claim 1, wherein said grinding wheel is driven from said engine by at least one belt stage.

6. A stump cutting apparatus as set forth in claim 5, wherein said at least one drive belt stage comprises first and second drive belt stages connected such that power to said second drive belt stage is transferred from said first drive belt stage via an idler shaft.

7. A stump cutting apparatus as set forth in claim 6, wherein said arm structure is pivotally connected to said turntable assembly at said idler shaft.

8. A stump cutting apparatus, said apparatus comprising:
   a frame structure;
   an engine;
   a turntable assembly having a rotatable plate element on which said engine is carried for rotational movement in a substantially horizontal plane;
   said turntable assembly further including a turntable bearing having first and second rings rotatable with respect to each other, said first ring being fixed with respect to said frame structure and said second ring being fixed with respect to said plate element;
   an arm structure pivotally connected to said turntable assembly for movement in a substantially vertical plane; and
   a grinding wheel rotatably mounted on said arm structure.

9. A stump cutting apparatus as set forth in claim 8, wherein at least one fluid-actuated cylinder is utilized to effect rotational movement of said plate element.

10. A stump cutting apparatus as set forth in claim 9, wherein rotational movement of said plate element is effected by a pinion gear engaging teeth defined on a ring of said turntable bearing.

11. A stump cutting apparatus as set forth in claim 8, wherein said arm structure is pivotally connected to said turntable assembly at a rotatable idler shaft.

12. A stump cutting apparatus as set forth in claim 11, wherein power from said engine to said grinding wheel is transmitted through said idler shaft.

13. A stump cutting apparatus as set forth in claim 12, wherein power from said engine to said grinding wheel is transmitted through said idler shaft by belts engaging pulley wheels fixed to said idler shaft.

\* \* \* \* \*